United States Patent
Zhang et al.

(10) Patent No.: US 12,429,560 B2
(45) Date of Patent: Sep. 30, 2025

(54) LIDAR SYSTEMS WITH SHARED MEMORY AND METHODS THEREOF

(71) Applicant: Shenzhen Adaps Photonics Technology Co. LTD., Shenzhen (CN)

(72) Inventors: Chao Zhang, Shenzhen (CN); Junzhong Xie, Shenzhen (CN); Zhijie Ma, Shenzhen (CN)

(73) Assignee: Shenzhen Adaps Photonics Technology Co. LTD., Shenzhen (CN)

( * ) Notice: Subject to any disclaimer, the term of this patent is extended or adjusted under 35 U.S.C. 154(b) by 964 days.

(21) Appl. No.: 17/548,359

(22) Filed: Dec. 10, 2021

(65) Prior Publication Data

US 2022/0099801 A1    Mar. 31, 2022

(30) Foreign Application Priority Data

Dec. 11, 2020  (CN) ......................... 202011436838.7

(51) Int. Cl.
  *G01S 7/48*     (2006.01)
  *G01S 7/4863*   (2020.01)
  *G01S 7/4865*   (2020.01)
  *G01S 17/10*    (2020.01)

(52) U.S. Cl.
  CPC .......... *G01S 7/4808* (2013.01); *G01S 7/4863* (2013.01); *G01S 7/4865* (2013.01); *G01S 17/10* (2013.01)

(58) Field of Classification Search
  CPC .... G01S 7/4808; G01S 7/4863; G01S 7/4865; G01S 17/10; G01S 17/89; G01S 7/4861
  See application file for complete search history.

(56) References Cited

U.S. PATENT DOCUMENTS

| | | | |
|---|---|---|---|
| 2018/0164415 A1 | 6/2018 | Buckley et al. | |
| 2021/0215807 A1* | 7/2021 | Henderson | G01S 7/4863 |
| 2022/0035010 A1* | 2/2022 | Caporale | G01S 7/4865 |
| 2022/0206146 A1* | 6/2022 | Beer | G01S 17/894 |
| 2023/0042254 A1* | 2/2023 | Sakaguchi | G01S 7/4816 |
| 2023/0324853 A1* | 10/2023 | Kappel | H04N 23/67 |
| | | | 341/111 |

FOREIGN PATENT DOCUMENTS

| | | |
|---|---|---|
| CN | 110596725 A | 12/2019 |
| CN | 111242145 A | 6/2020 |

OTHER PUBLICATIONS

Office Action dated May 13, 2021 for Chinese Application No. 202011436838.7.

* cited by examiner

*Primary Examiner* — Isam A Alsomiri
*Assistant Examiner* — Joseph C Fritchman

(57) ABSTRACT

The present invention is directed to lidar systems and methods thereof. In a specific embodiment, the present invention provides a lidar system that includes a SPAD sensor that includes two or more SPAD pixels. The outputs of the two or more SPAD pixels are processed to generate two sets of histogram data. The two sets of histogram data are encoded to generate at least two sets of replicate histogram data that are shifted by predefined offset values. The two sets of histogram data and the at least two sets of replicate histogram data share the same memory block. There are other embodiments as well.

18 Claims, 10 Drawing Sheets

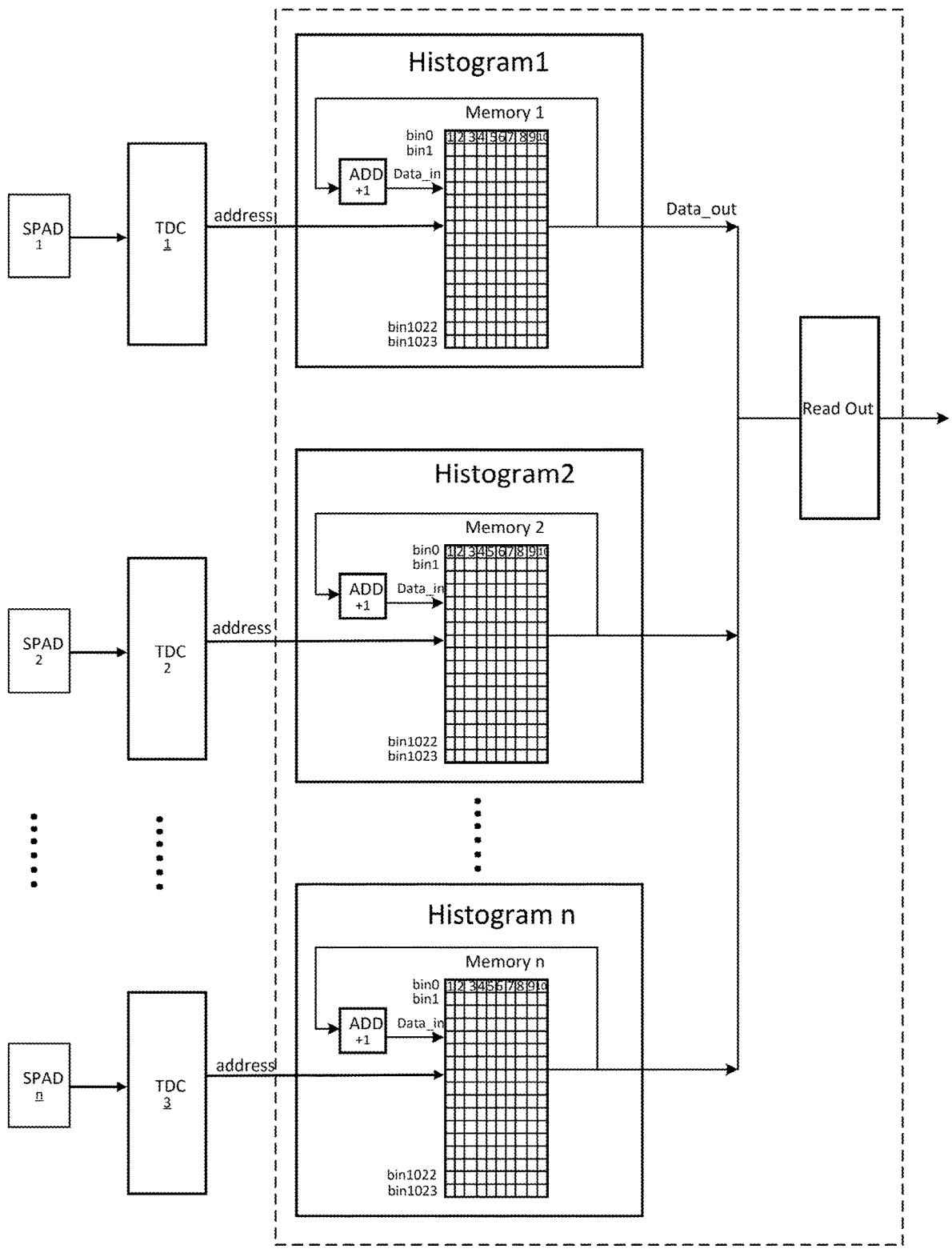
Figure 1C
(Conventional)

LIDAR SYSTEMS WITH SHARED MEMORY AND METHODS THEREOF

CROSS-REFERENCES TO RELATED APPLICATIONS

The present invention claims priority to China Patent Application No. 202011436838.7, filed Dec. 11, 2020, which is commonly owned and incorporated by reference herein for all purposes.

BACKGROUND OF THE INVENTION

The present invention relates generally to lidar sensing devices.

Research and development in integrated microelectronics have continued to produce astounding progress with sensor devices. Many examples of photodiodes exist. For example, a photodiode is a p-n junction or PIN structure. When a photon of sufficient energy strikes the diode, it creates an electron-hole pair. This mechanism is also known as the inner photoelectric effect. If the absorption occurs in the junction's depletion region, or one diffusion length away from it, these carriers are swept from the junction by the built-in electric field of the depletion region. Thus, as holes move toward the anode (electrons move toward the cathode), a photocurrent is produced. The total current through the photodiode is the sum of the dark current (current that is generated in the absence of light) and the photocurrent, so the dark current must be minimized to maximize the sensitivity of the device.

Another example of a photodiode is called an "avalanche photodiode". The avalanche photodiodes are photodiodes with a structure optimized for operating with high reverse bias, approaching the reverse breakdown voltage. This allows each photo-generated carrier to be multiplied by avalanche breakdown, resulting in internal gain within the photodiode, which increases the effective sensitivity of the device. A type of photodiode—usually referred to as a single-photon avalanche diode (SPAD) device—has been gaining popularity and used in a variety of applications, such as lidar systems that have become a mainstream component of consumer electronics, automobiles, and other applications. A SPAD sensor circuit includes multiple SPAD pixels, which is typically arranged as a two-dimensional array. A SPAD sensor circuit may be an important component of a lidar system.

A lidar system includes many components in addition to SPAD circuits. SPAD circuits convert received light signals to electrical currents, and the converted electrical currents are converted to digital signals—along with their associated timing information—by time-to-digital converters (TDCs). And digital signals are stored and processed because they can be used in lidar applications. For example, digital signals are often stored in a predefined memory module before further processing. Unfortunately, existing such memory modules for lidar applications have been inadequate.

From the above, it is seen that techniques for improving sensing devices are highly desired.

BRIEF SUMMARY OF THE INVENTION

The present invention is directed to lidar systems and methods thereof. In a specific embodiment, the present invention provides a lidar system that includes a SPAD sensor that includes two or more SPAD pixels. The outputs of the two or more SPAD pixels are processed to generate two sets of histogram data. The two sets of histogram data are encoded to generate at least two sets of replicate histogram data that are shifted by predefined offset values. The two sets of histogram data and the at least two sets of replicate histogram data share the same memory block. There are other embodiments as well.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 1C is a simplified block diagram illustrating a conventional lidar whose histogram memory blocks are statically allocated to SPAD pixels and their corresponding TDCs.

DETAILED DESCRIPTION OF THE INVENTION

Figure 1A:
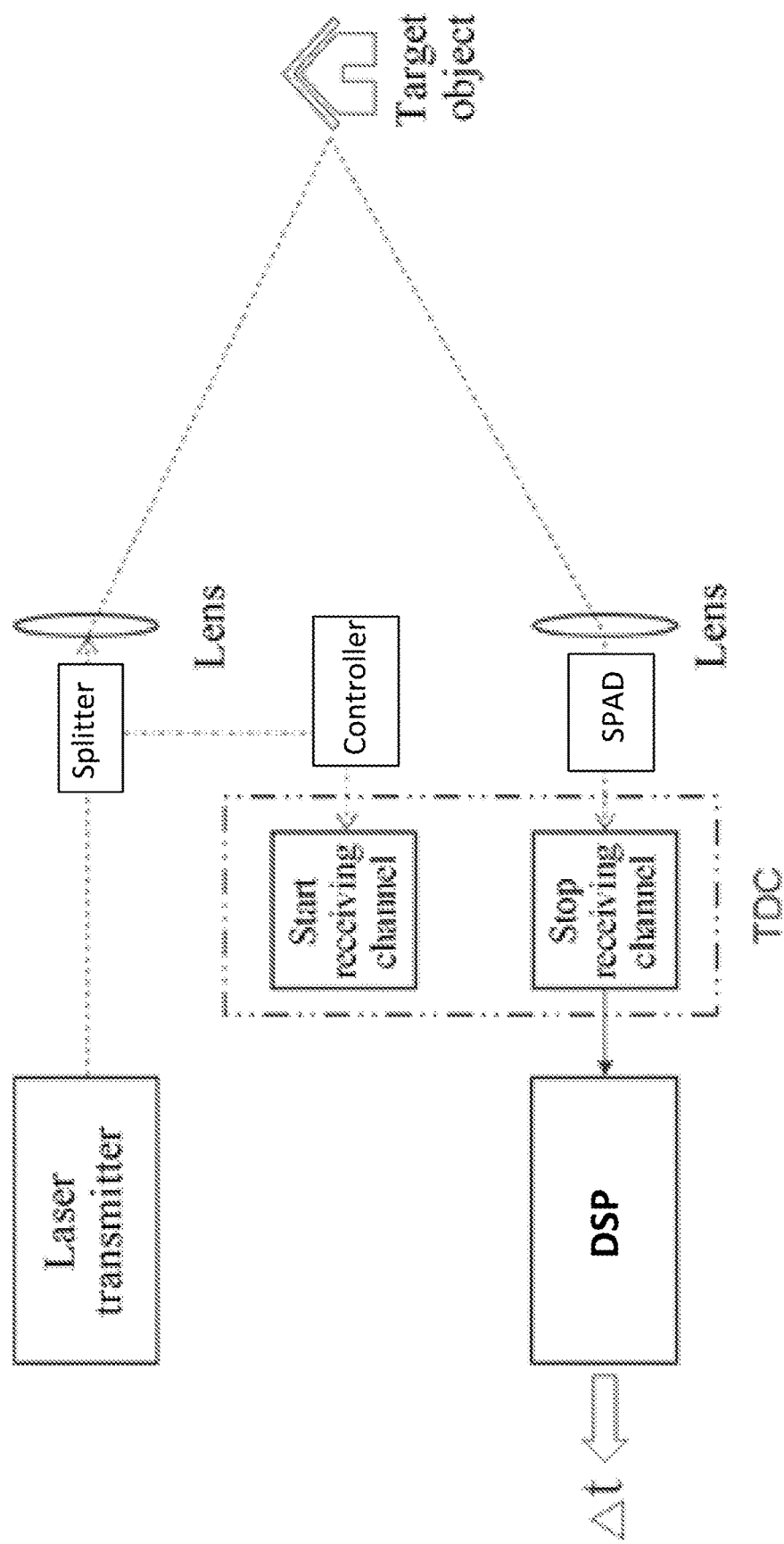
FIG. 1A is a simplified block diagram of a lidar according to embodiments of the present invention.

The present invention is directed to lidar systems and methods thereof. In a specific embodiment, the present invention provides a lidar system that includes a SPAD sensor that includes two or more SPAD pixels. The outputs of the two or more SPAD pixels are processed to generate two sets of histogram data. The two sets of histogram data are encoded to generate at least two sets of replicate histogram data that are shifted by predefined offset values. The two sets of histogram data and the at least two sets of replicate histogram data share the same memory block. There are other embodiments as well.

The operating principle of various types of lidar systems involves: transmitting a laser light at the first time, and if the transmitted laser light pattern is reflected from an object, the reflected laser light is received at a second time. Because the speed of light is known, distance from the lidar system to the object is calculated using the time difference, which is often referred to as direct time of flight, or "dToF". Lidar system implemented using SPAD pixels involving constructing histograms in real-time based on the received light, which includes both reflected laser light and noise (ideally, most of the noise is filtered). The histograms corresponding to SPAD pixels are stored in a memory module and updated periodically. Usually, a fixed amount of memory is predefined and allocated for each of the SPAD pixels. The size of total memory depends on the number of pixels, bit-depth (dynamic range), and temporal resolution (e.g., number of "time bins" as explained below). The memory module takes up valuable circuit area and typically consumes a large amount of power, which translates to heat generation in operation. It is typically desirable to minimize memory size both for cost, power consumption, and thermal concerns. It is thus to be appreciated that embodiments of the present invention provide systems and methods for reducing memory size through memory sharing among output of SPAD pixels. More specifically, histogram data of multiple SPAD pixels are store in a single memory block that in conventional lidar system can only store histogram data for a single SPAD pixel.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object.

FIG. 1A is a simplified block diagram of a lidar according to embodiments of the present invention. This diagram is merely an example, which should not unduly limit the scope of the claims. One of ordinary skill in the art would recognize many variations, alternatives, and modifications. As shown in FIG. 1, a laser transmitter of a dToF module transmits a pulse wave to a target object. A SPAD sensor receives the pulse wave reflected by a target object. The output signal of the SPAD sensor is processed by a time-to-digital converter (TDC). For example, the TDC performs time-to-digital signal conversion, which generally involves sampling and converting output of SPAD sensor to histogram data.

The TDC can record the time of flight (TOF) of each received optical signal, i.e. the time interval between a transmitted pulse and its corresponding received pulse. For example, a dTOF module transmits and receives N optical signals within a predefined time window, and then makes histogram statistics on recorded n TOFs, where a TOF t corresponding to a position of the highest signal intensity or where the SPAD is triggered the most times is used to calculate a depth of a to-be-measured object.

Direct time of flight (dTOF) is one of the mainstream 3D imaging methods in recent years, in which main components used include a SPAD array. As explained above, a SPAD is a detector with a high gain, a high sensitivity, and other advantages. A single SPAD connected to a TDC (or sometimes ADC) can directly generate a digital signal. For example, "0" is outputted in a case of "no signal", and "1" is outputted in a case of "signal". In depth determination applications, a lidar uses two representative forms of a silicon photomultiplier (SiPM) and a SPAD array to implement ranging. For example, SPAD output ports in the SiPM can be connected in parallel as a whole output signal. With a number of SPAD pixels, the identification of signal light intensity can be realized. Respective pixels in the SPAD array individual output their signals, which allow for reconstruction of an image based on the light signal reflected off the target object.

Signal intensities outputted by the SPAD are generally represented using histograms, and a system requires a large amount of memory to record the histograms. However, in general cases, the memory of useful information (e.g., received light that matches the transmitted laser pulse) is much smaller than the allocated total memory. The unused memory is wasted, and the unnecessary memory allocation increases data processing and transmission load, and increases system power consumption. In various embodiments of the present invention, outputs of SPAD pixel share memory blocks by, among other mechanisms, sharing memory space, data replication, encoding, decoding, and error correction.

Figure 1B:
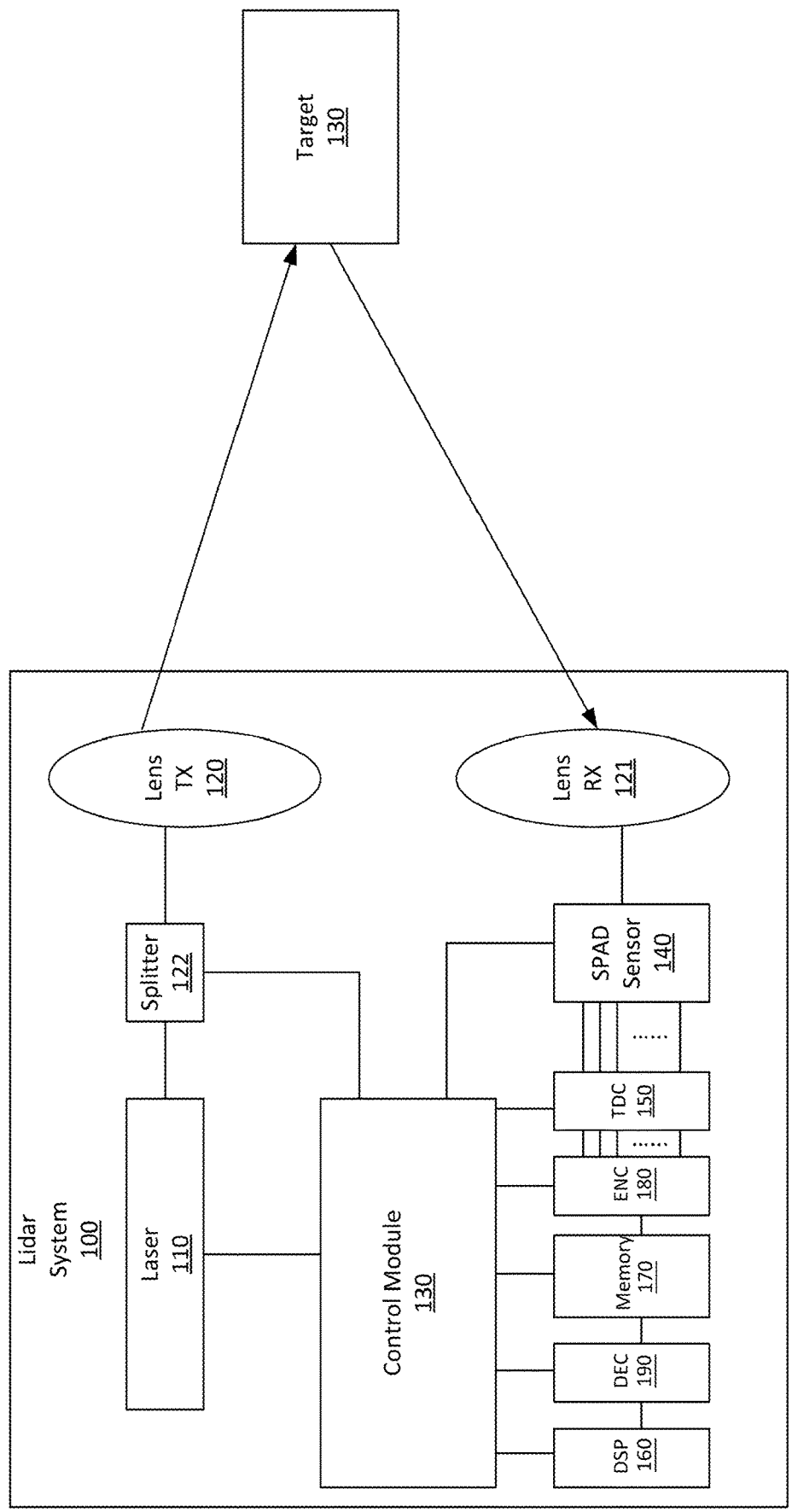
FIG. 1B is a simplified block diagram illustrating a lidar with memory multiplexing according to embodiments of the present invention.

FIG. 1B is a simplified block diagram illustrating lidar system 100 with memory multiplexing according to embodiments of the present invention. This diagram is merely an example, which should not unduly limit the scope of the claims. One of ordinary skill in the art would recognize many variations, alternatives, and modifications. In principle, lidar system 100 measures distance by calculation the time differences between transmitted light signals and the corresponding received signals. Laser 110, as controlled by the control module 130, emits laser pulses at predefined intervals. As example, laser 110 may include stacked laser diodes that emit diffracted laser beams. Depending on the application, the output of laser 110 may be pulsed infrared laser signals. The laser pulse profile (e.g., width, shape, intensity, etc.) and the predefined intervals depend largely on the lidar system implementation and specifications, such as power, distance, resolution, and others. It is to be noted that since both the laser pulse shape (which can be described as a signal waveform) and pulse width are known characteristics to the lidar system 100, characteristics such as pulse shape and width are used in optimizing memory sharing. Lidar system 100 is configured to reconstruct images, with distance information, using a SPAD array that includes many SPAD pixels. For this application, the output of the laser 110 is manipulated to create a predefined pattern. It is understood that lens 120 refers to an optical module that may include multiple optical and/or mechanical elements. In certain implementations, lens 120 includes diffractive optical elements to create a desired output optical pattern. Lens 120 may includes focusing and optical correction elements.

Control module 130 manages operations and various aspects of lidar system 100. As shown, control module 130 is coupled to laser 110 and splitter 122, along with other components. Depending on the embodiment, control module 130 can be implemented using one or more microprocessors. Components such as TDC 150, encoder 180, decoder 190, and digital signal processor (DSP) 160 as shown are functional blocks that are—on the chip layer—implemented with the same processor(s) for the control module 130. In addition to providing control signal signals to laser 110, control module 130 also receives the output of the laser 110 via splitter 122. Based on the output of splitter 122, control module 130 activates SPAD sensor 140, TDC 150, and other components to process received signals. Additionally, the output of splitter 122 provides the timing of the outgoing light signal, and this timing information is later used in dToF calculations.

The transmitted laser signal, upon reaching target 130 as shown, is reflected. The reflected laser signal is received by lens 121, which focuses the received laser signal onto SPAD sensor 140. Lens 121 may include multiple optical and mechanical elements. SPAD sensor 140 converts the received laser signal to arrival signal pulses. In various embodiments, SPAD sensor 140 is implemented as a maro pixel that is commonly referred to as a digital silicon photomultiplier (dSiPM). TDC 150 includes a number (e.g., equal to the number of SPAD pixels) of TDCs that are configured to process the arrival time of multiple pulses generated by SPAD sensor 140. For example, TDCs of block 150 may be individually coupled to their corresponding SPAD pixels of block 140.

As explained above, conventional lidar systems are implemented with a memory module with memory blocks that are pre-assigned to SPAD pixels. For example, each SPAD pixel is assigned n time bins, with each time bin storing the intensity of a number of pulses generated by the corresponding SPAD pixel within the predetermined time interval assigned to the time bin. In various embodiment, within a time interval corresponding to n time bins, only a laser pulse is transmitted, which means that at the receiving end, at most only one laser pulse may be received, and the other information stored at the n time bins are most likely to be noise. It is to be appreciated that embodiments of the present invention take advantage of the fact that meaningful information only occupies a small portion of the memory space, and multiple SPAD pixels can share a single memory block by storing replicated pulsed laser at predefined offset locations.

Figure 2:
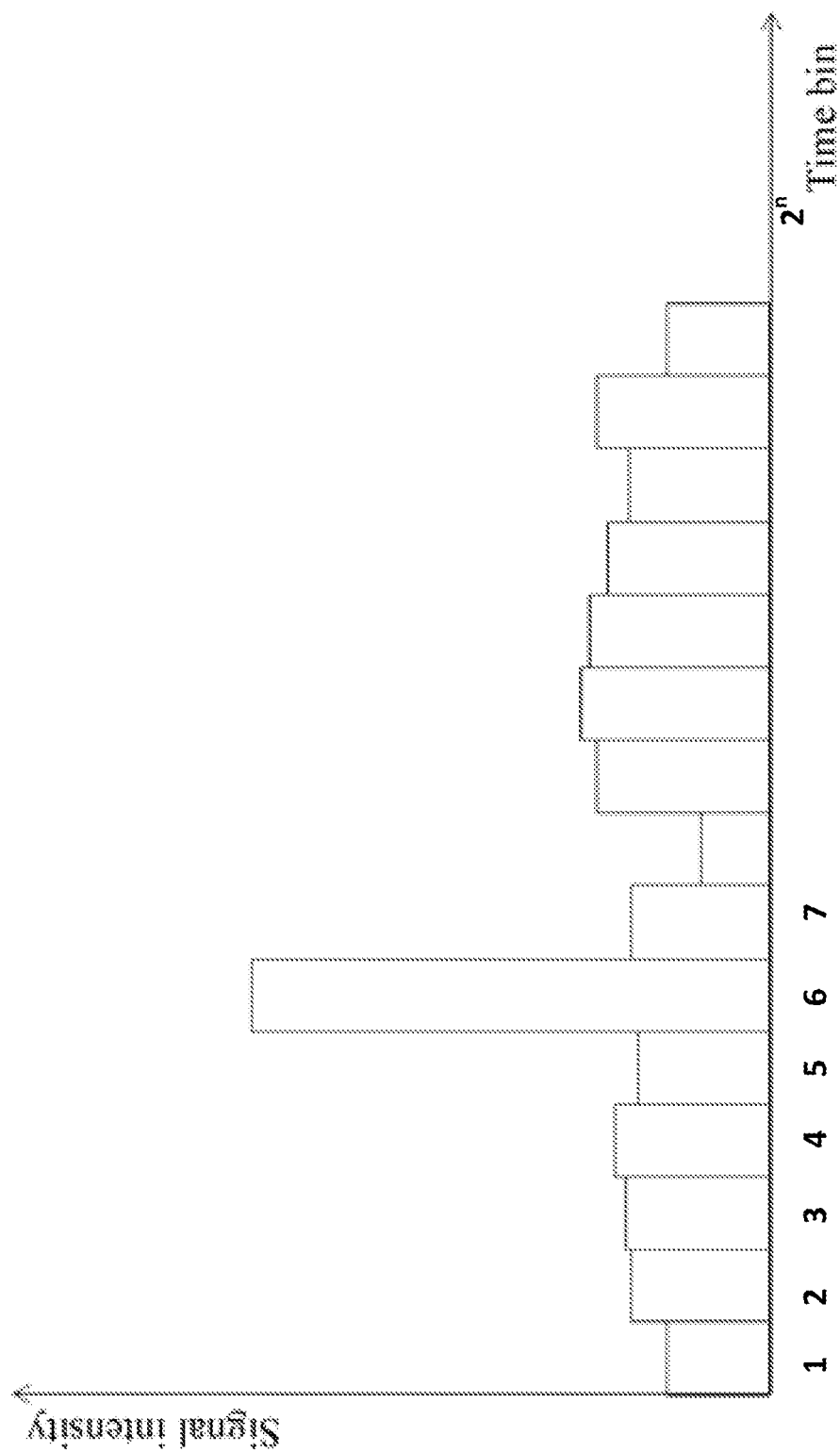
FIG. 2 is a plot illustrating a histogram corresponding to a SPAD pixel for a predefined time period used in a lidar system.

FIG. 2 is a plot illustrating a histogram corresponding to a SPAD pixel for a predefined time period used in a lidar system. Signal intensities outputted by the SPAD are generally represented in the histogram plot as shown. As shown in FIG. 2, the horizontal (x) axis is for the time bin, and the vertical (y) axis is for signal intensity. On the time bin axis, there is a predetermined number of "bars" as shown, where each bar in the histogram represents a signal intensity corresponding to a time block. Each of the bars corresponds to a predefined time interval. In FIG. 2, bar 6 corresponds to a peak signal density that indicates the reflected laser signal pulse is received at bar 6 of the time bin. In various implementations, the x-axis is configured to accommodate $2^n$ bars. At other times (e.g., bars 1-5 and 7), the low-intensity signals are likely to be noise, which may be attributed to light signals (e.g., sunlight, internal reflection, etc.) that are not emitted by the pulsed laser. Additionally, noise may be attributed to electrical components, such as inter-pixel crosstalk among SPAD pixels. It is to be appreciated lidar systems according to embodiments of the present are calibrated such that the noise level is much lower relative to the signal level and would not affect the memory sharing process that involves encoding and decoding the histogram data.

In operation, n optical signals are transmitted and received within a single time interval or frame, and then recorded n TOFs are made into a histogram. Since the pulse width of a transmitted optical signal is known, pulse width and/or other information is used to remove noise from the histogram. For example, match filtering is one of the denoising is used. A time t (i.e., TOF) corresponding to maximum signal intensity in the histogram may be used for calculating a distance s of the target object (e.g., target 130 in FIG. 1B). As discussed, distance can be calculated from the roundtrip flight time (i.e., s=c*t/2, c being the light speed).

Now referring back to FIG. 1B, histograms such as the sone shown in FIG. 2 are configured as a data structure being stored in memory 170. The depths and bit widths of memory of each SPAD are defined according to operating parameters of the lidar system 100. These operating parameters include lidar range, resolution, SNR of a dTOF system, and other factors. In various embodiments, within a single-frame interval as predefined for the lidar system, memory allocated to each SPAD is used for recording the number of times the SPAD generates pulse in the corresponding time bin. For example, a memory block may include $2^n$ time bings, and each unit of memory address corresponds to the time bins.

Figure 3:
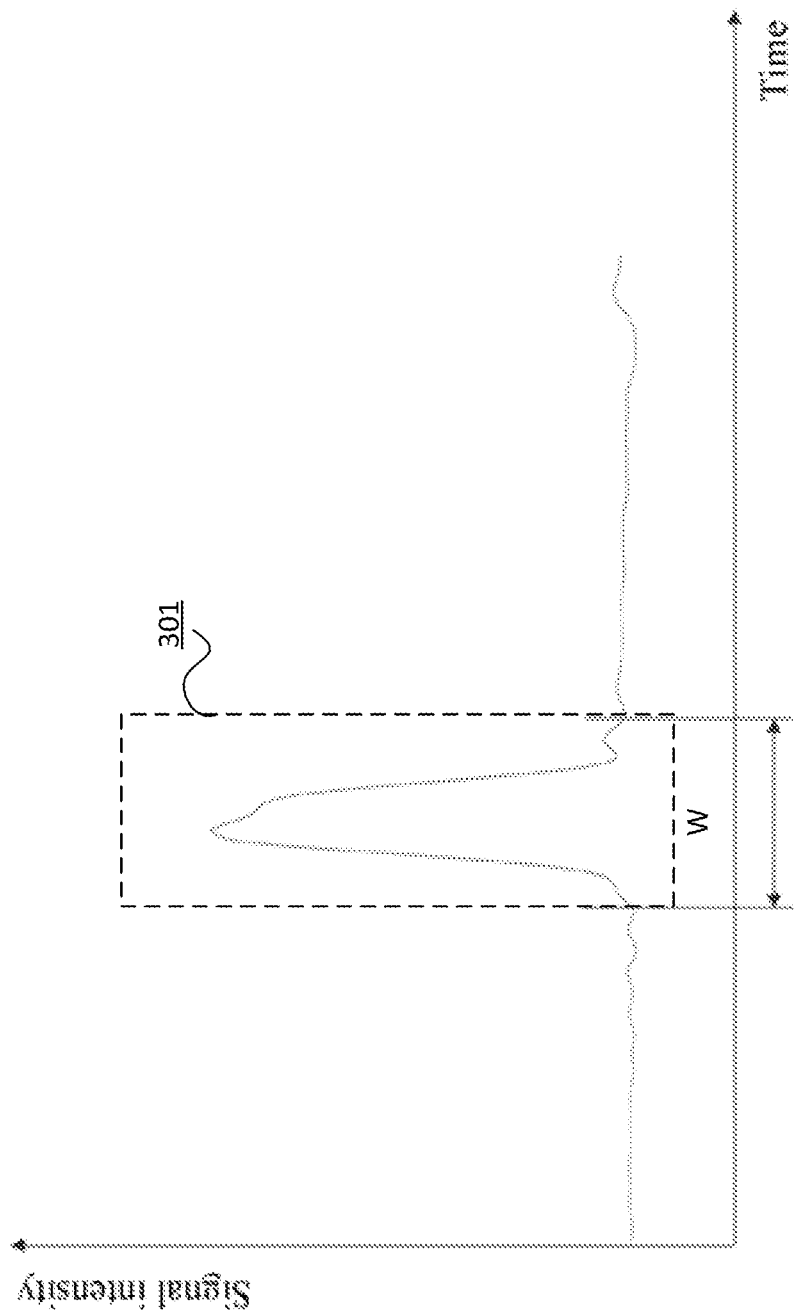
FIG. 3 is a plot illustrating a received waveform and its valid data region.

FIG. 3 is a plot illustrating a received waveform and its valid data region. For example, the received waveform in FIG. 3 correspond to the histogram data illustrated in FIG. 2. In a single time interval, which corresponds to a memory block allocated to a SPAD, the valid pattern 301 is stored within a memory address range corresponding to a flight time (i.e., reflective of the target distance), and stored data in other addresses are noise. This is because the width of pattern 301 is a known quantity and is based on (and substantially equal to) the pattern of the transmitted laser pulse signal. For example, pattern 301 may be referred to as "valid data region" with a width "W" that is associated with the laser pulse that is transmitted, as the region outside 301 contains mostly noise that is not useful in ToF calculation. In general cases, the memory size of valid records (e.g., such as pattern 301) is much smaller than a total memory. In conventional lidar systems, the unused memory (space outside "W" in FIG. 3) is allocated because depending on the target distance, the received waveform with the width of "W" could be positioned anywhere within the predefined time frame. It is to be appreciated that embodiments of the present invention provide mechanisms for sharing memory space, where multiple pulses with the width "W" can be stored in the same memory block, thereby, among other benefits, reducing memory waste, reducing data processing, and transmission load, and decreasing system power consumption.

Now referring back to FIG. 1B. Lidar system 100 reduces the amount of memory space by taking advantage of the fact that within a predefined time period, a SPAD pixel should only capture a single pattern (e.g., pattern 301 in FIG. 3) that substantially matches the pattern of the signal generated by laser 110. However, since the time bin axis (e.g., as shown in FIG. 2) correspond to location, and different SPAD pixels may process light signal corresponding to the same time bin, simply combining histograms of different SPAD pixels would not work due to possible histogram data overlap. To address data overlap at memory 170, outputs of TDC 150 are encoded. The output for each of the SPAD pixels is replicated at one or more offset locations on the time bin. Encoder 180 is configured to replicate TDC 150 outputs at different offset locations before replicated data are stored at memory 170, and the data corresponding to multiple SPAD pixels can be stored on a single memory block of the memory module 170. To access and use data stored in memory 170, the decoder 190 retrieves SPAD at different offset locations and filters out invalid data (i.e., overlapping SPAD data). The DSP 160 processes the output of decoder 190. For example, DSP 160 may perform various processes such noise removal, ToF calculation, distance calculation, image reconstruction, and/or other functions. Depending on the implementation, functions performed at block 160 may be performed by other modules and/or the microprocessor.

FIG. 1C is a simplified block diagram illustrating a conventional lidar whose histogram memory blocks are statically allocated to SPAD pixels and their corresponding TDCs. This diagram is merely an example, which should not unduly limit the scope of the claims. One of ordinary skill in the art would recognize many variations, alternatives, and modifications. As shown in FIG. 1C, each SPAD has its corresponding TDC and memory block. For example, TDC 1 as shown is configured to process SPAD 1 output for storing at memory 1, TDC 2 is configured to process SPAD 2 output for storing at memory 2, and there are n memory blocks for n SPAD pixels. In some instances, two or more SPAD pixels may share a single TDC, but the SPAD and its corresponding memory block retain a one-to-one relationship for the reasons explained above. It is to be appreciated that embodiments of the present allow multiple SPAD pixels to share a single memory block. Instead of n memory blocks for n SPAD pixels, there are m memory blocks, wherein n a multiple of m (e.g, n=4*m, etc.).

Figure 1D:
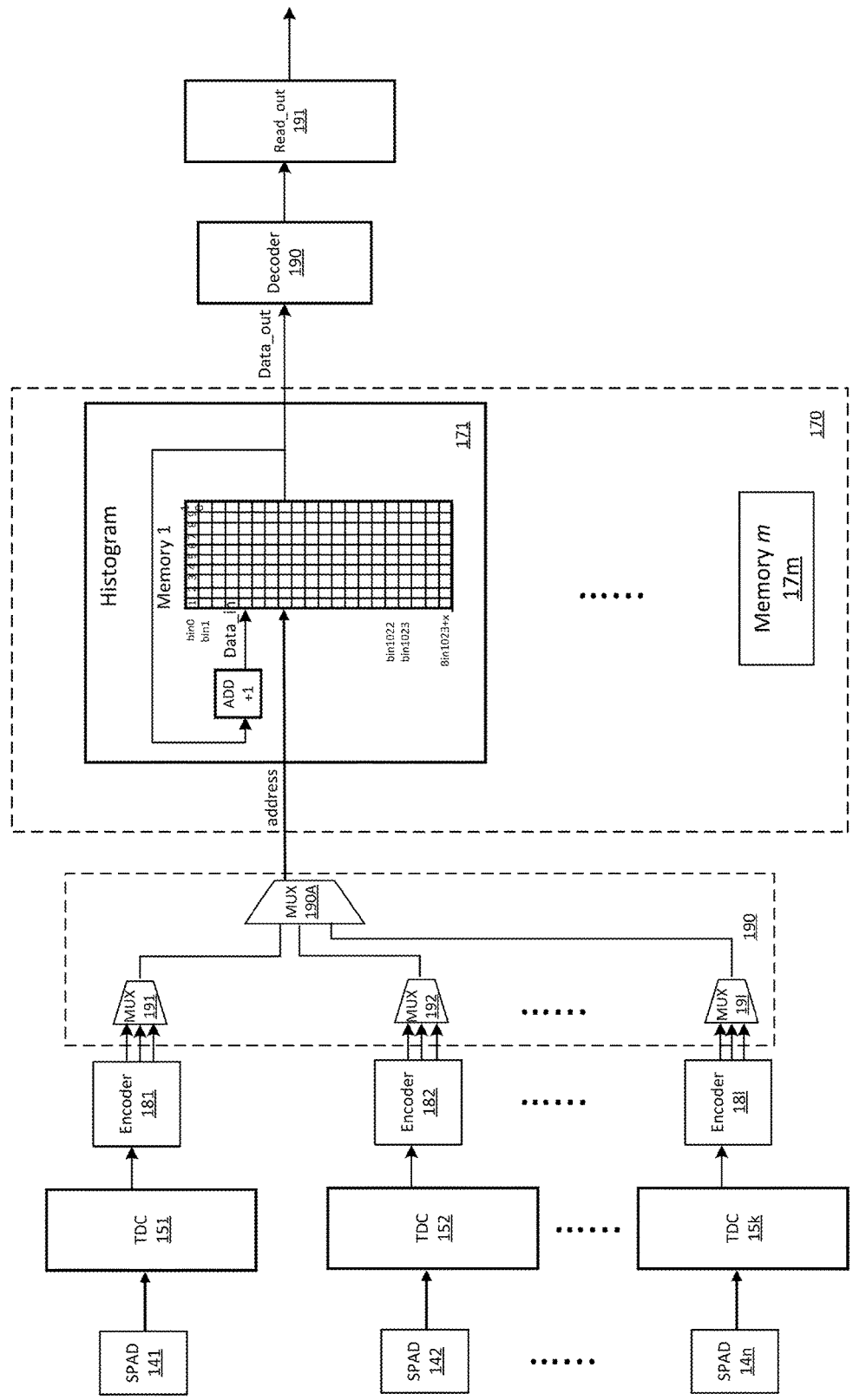
FIG. 1D is a simplified block diagram illustrating multiple SPAD pixels sharing a memory block that stores encoded outputs from TDCs according to embodiments of the present invention.

FIG. 1D is a simplified block diagram illustrating multiple SPAD pixels sharing a memory block that stores encoded outputs from TDCs according to embodiments of the present invention. This diagram is merely an example, which should not unduly limit the scope of the claims. One of ordinary skill in the art would recognize many variations, alternatives, and modifications. As an example, FIG. 1D shows components of lidar system 100 illustrated in FIG. 1B. SPAD pixels 140-14n corresponds to n SPAD pixels of SPAD sensor 140. TDCs 151-15k corresponds to kTDC at TDC block 150 in FIG. 1B. In some embodiments, the number of TDCs equal to the number of SPAD pixels (i.e., k=n). In certain implementations, multiple SPAD pixels may share a single TDC, and n is an integer multiple of k. The encoder block 180 in FIG. 1B, for example, includes/encoders 181-181. Depending on the implementation, multiple encoders may be assigned to a single TDC, as outputs of a TDC (which correspond to the output of one or more SPAD pixels) are replicated multiple times for the intended storage redundancy, which is explained below.

Figure 1E:
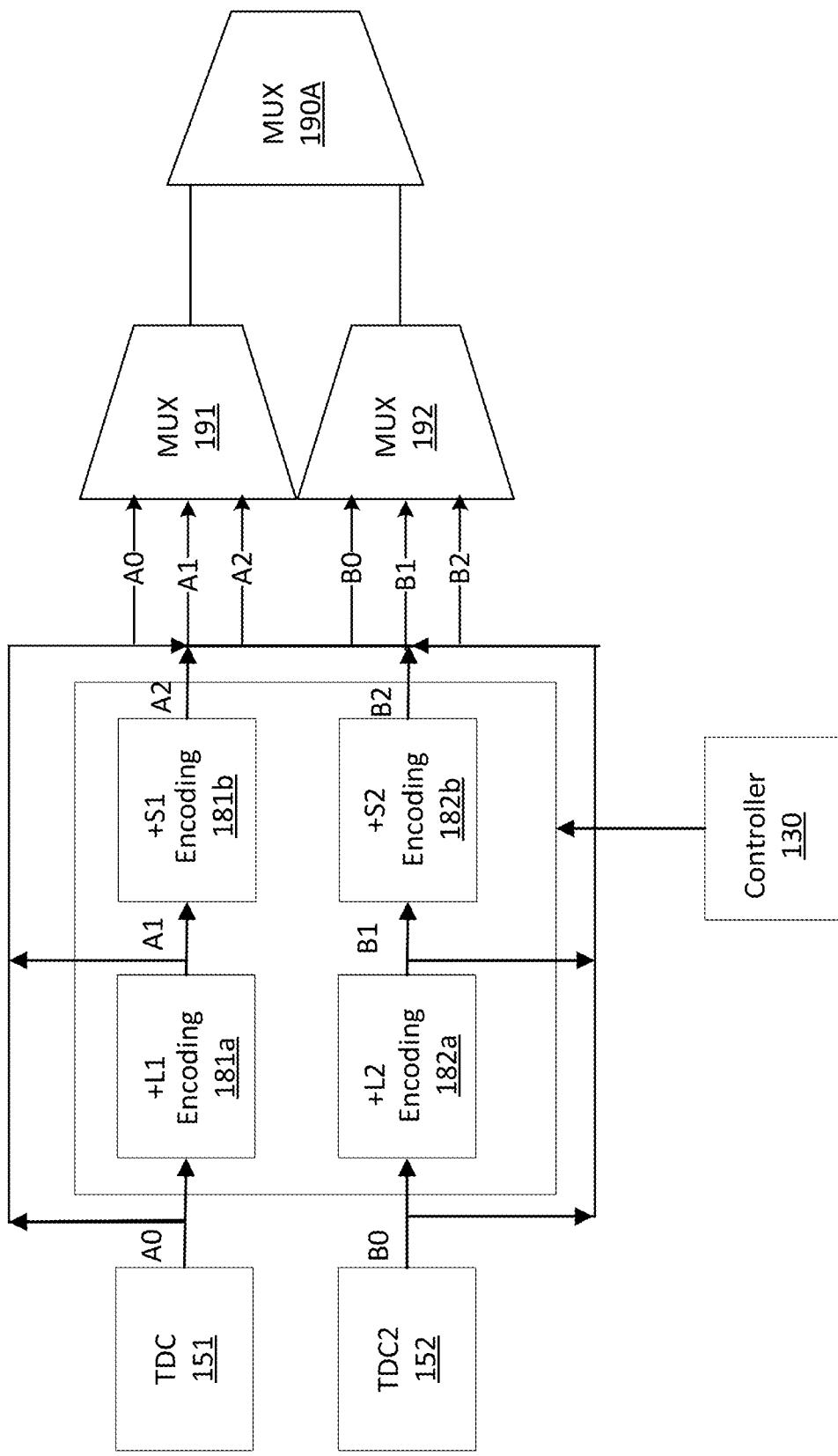
FIG. 1E is a simplified diagram illustrating an exemplary encoding scheme for sharing a memory block according to embodiments of the present invention.

Encoders 181-181 are configured to add offset values to TDC outputs to shift the storage locations of replicate TDC output. FIG. 1E is a simplified diagram illustrating an exemplary encoding scheme for sharing a memory block according to embodiments of the present invention. This diagram is merely an example, which should not unduly limit the scope of the claims. One of ordinary skill in the art would recognize many variations, alternatives, and modifications. FIG. 1E only shows TDCs 151-152, for illustration purposes, and it is understood that outputs of more than two TDCs (and their corresponding SPAD pixels) are encoded for memory sharing purposes. The output of TDC 171 is replicated twice, the replicates shifted by an offset of "+L1" and "+S1" as shown, and the offset encodings are respectively performed by encoder 181$a$ and 181$b$. Depending on the implementation, a different number of encoders may be used to calculate offsets for replicate TDC outputs. For example, three encoders may be configured and assigned to a single TDC to encode three output replicates of this TDC, each replicate with its own offset value encoded by its respective decoder. MUX 191 receives three inputs based on TDC 151: the A0 input is the original output of TDC 151 to be stored at the original time bin location, the A1 input is the original output of TDC 151 whose time bin is shifted by an offset "L1", and the A2 input is the original output of TDC 151 whose time bin is shifted by an offset "S1". Similarly, the output of TDC 152 is replicated and shifted in a similar way to generate outputs B0, B1 (with offset L2), and B2 (with offset S2) as shown. As explained below, offset values "L1", "S1", "L2", and "S2" are predefined and different values. These offset values are predefined to ease the decoding process. These offset values are also different—specially selected for the implementation—to minimize the probability of overlapping. In a specific embodiment, offset values are predefined such that L1+S1≠L2+S2, and |L1-L2|>2W and |L1+S1−(L2+S2)|>2W, where "W" is illustrated in FIG. 3 and explained above.

MUX selectors 191 and 192 are coupled to MUX selector 190A, which performs write multiplexing so encoded TDC data—including replicated data encoded offset—are written to the memory module. For example, MUX selector 190A may be implemented as a part of the memory controller module. In certain embodiment, memory addressing, encoding, and other functions may be performed or facilitated by controller 130.

Now referring back to FIG. 1D. Memory module 170 includes m memory blocks 117-17$m$. As data for multiple SPAD pixels are stored in a single memory block, there are fewer memory blocks than SPAD pixels (i.e., m is less than n). For example, in a scheme where four SPAD pixels share a single memory block, m=n/4. For example, the term "memory block" refers a memory location with a predefined number of memory units, where each memory unit stores data associated with a time bin on the histogram. For the purpose of illustration, the TDC output data structure may be described as a vector (or a one-dimensional matrix) that includes direction (time bin) and magnitude (intensity). For example, the first row "bin 0" corresponds to time bin 0 in the histogram of SPAD 141, and there are 1023+x memory units in memory block 171. In various embodiments, memory module 170 comprises a synchronous dynamic random-access memory (SDRAM), and memory blocks for storing histogram correspond to memory section addresses. As shown in FIG. 1D, an adder or accumulator is implemented with memory 171, the TDC output (and its encoded replicates) are added to corresponding memory units (e.g., bin0, bin1 . . . bin1023, and 1023+x). Memory block 171 as shown includes a time bin section and an extended section. The time bin section includes $2^n$ memory units, and the extended section includes x memory units. In comparison to conventional histogram memory storage structure (e.g., s illustrated in FIG. 1B) that allocates the $2^n$ of memory units to $2^n$ time bins, memory block 171 includes $2^n$+x memory units, where the $2^n$ unit units correspond to $2^n$ time bins, the x memory units are provided to accommodate the replicate TDC output values, as the offsets such as "L1" and "S1" could shift replicate TDC output to memory locations outside $2^n$ memory unit.

Before the content of memory module 170 can be read (e.g., at block 191) and used decoder 190 first decodes decoding. For each memory block, decoder 190 determines the locations corresponding to TDC outputs and replicates and filters out invalid data. In a shared memory block, output and replicates of one TDC may overlap with that of another TDC. In various embodiment, decoder 190 uses widths of histogram pulse shape to identify overlapping data. For example, a pulse shape stored in the memory that is wider than the expected received pulse width could be an indication that this stored pulse shape corresponds to overlapping data and is therefore invalid.

Figure 4:
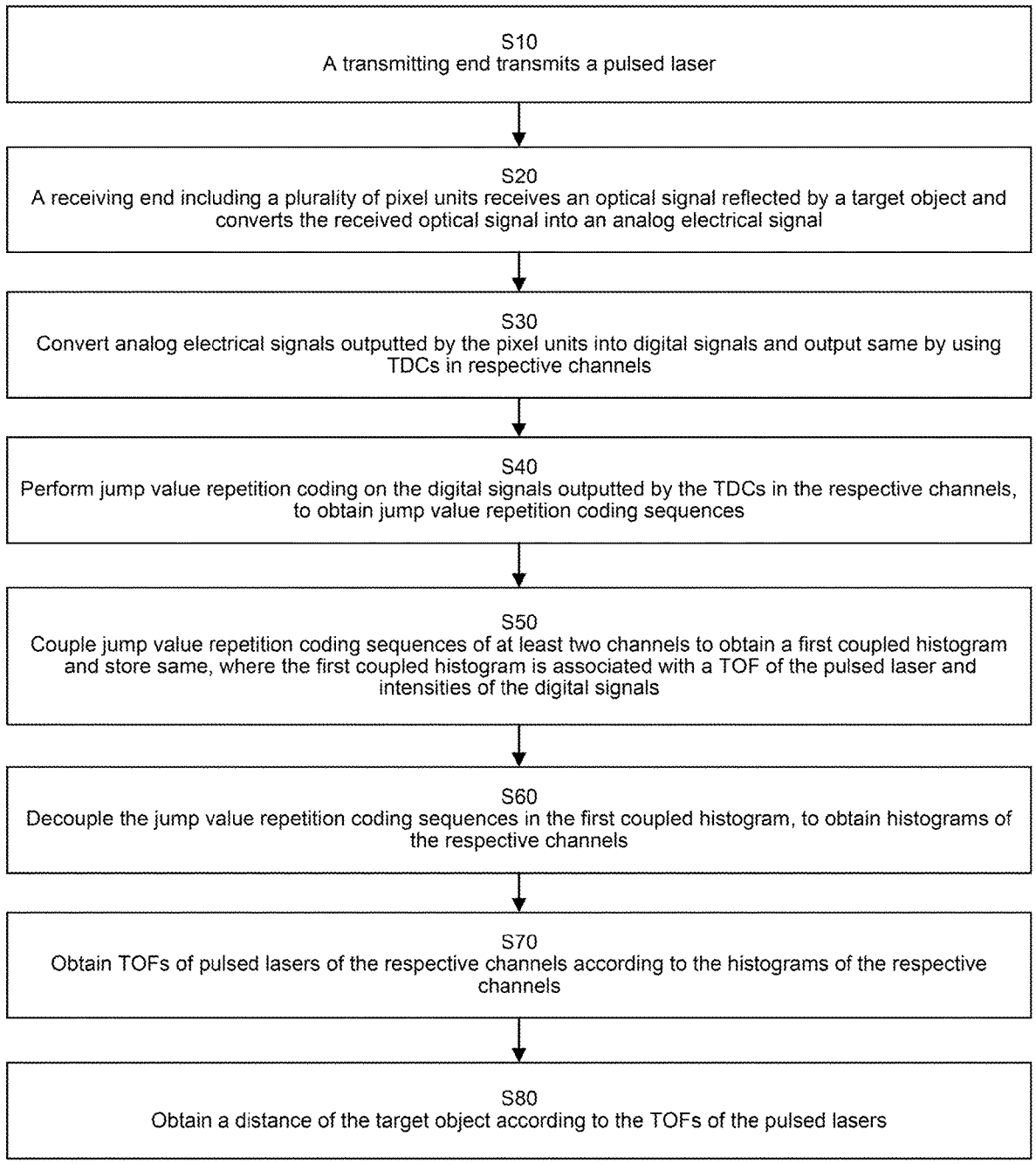
FIG. 4 is a simplified flowchart of operating a lidar according to an embodiment of this application.

FIG. 4 is a simplified flowchart of operating a lidar according to an embodiment of this application. This diagram is merely an example, which should not unduly limit the scope of the claims. One of ordinary skill in the art would recognize many variations, alternatives, and modifications. For example, one or more steps in FIG. 4 may be added, removed, repeated, replaced, modified, and/or overlapped, and they should not limit the scope of the claims. As shown in FIG. 4:

S10. A transmitting end transmits a pulsed laser. For example, the pulsed laser is may be generated by laser 110 and transmitted via lens 120 in FIG. 1B.

S20. A receiving end receives an optical signal reflected by a target object and converts the received optical signal into an analog electrical signal, where the receiving end includes a plurality of pixel units. The pixel units herein may include a SPAD. For example, the receiving end may include lens 121 and SPAD sensor 140 in FIG. 1B.

S30. Convert analog electrical signals outputted by the pixel units into digital signals and output the same by using TDCs in respective channels. Intensities of the digital signals respectively outputted by the plurality of TDCs are used for generating histograms on respective TDC channels, where the histograms are represented by vectors including histogram values.

S40. Perform offset value replicate coding on the digital signals outputted by the TDCs in the respective channels, to obtain offset value replicate coding sequences. For example, an exemplary encoding mechanism is illustrated in FIG. 1E. Where vectors of the histogram values are used for representing the histogram, the vectors may be shifted and superimposed a plurality of times, to obtain the encoded coded vectors. In various implementations, the amount of offset shift (e.g., size of "L1" and "S1") of the respective vectors are predefined and may be fixed. Further, encoded vectors in at least two channels may be added (e.g., as interleaved by the multiplexer 190A in FIG. 1D), to obtain the first coupled histogram vectors and store the same. As explained earlier, the term "vector" refers to outputs of TDCs that are stored in a histogram data structure (e.g., intensity per time bin).

S50. Couple offset value replicate coding sequences of at least two channels to obtain a first coupled histogram and store same, where the first coupled histogram is associated with a TOF of the pulsed laser and intensities of the digital signals. For example, the term "couple" or "coupling" here refers to the writing (or, more precisely, adding) process where two or more TDC outputs—and their replicates—are stored in the same memory block.

S60. Decouple the offset value replicate coding sequences in the first coupled histogram, to obtain histograms of the respective channels. For example, the term "decouple" or "decoupling" refers to the process of reading and decoding the data stored in the memory to obtain histograms corresponding to their respective TDC outputs. When the offset value replicate coding sequences in the first coupled histogram are decoupled, a match filtering process may be performed on the first coupled histogram first, to obtain a second coupled histogram; and then decoupling is performed on the second coupled histogram, to obtain the histograms of the respective channels. For example, match filtering parameters may be defined based on coding mechanism, pulse width, the transmission power of the transmitted pulsed laser, and/or other factors.

The decoupling or decoding process involves identifying and eliminating overlapping pulse signals stored in the memory. In various implementations, to decouple the second coupled histogram to obtain the histograms of the respective channels, half-height widths of respective peaks in the second coupled histogram may be compared with the transmission pulse width of the transmitted pulsed laser. For example, when there are more than two offset value replicate coding sequences of the second coupled histogram in the respective channels, the second coupled histogram is decoupled, to obtain the histograms of the respective channels.

In an embodiment, match filtering is performed on the first coupled histogram first, to obtain the second coupled histogram; and then decoupling is performed on the second coupled histogram, to obtain the histograms of the respective channels. However, it should be understood that, there are no limitations on the sequence of match filtering and decoupling, and decoupling may be alternatively performed before match filtering. That is, decoupling is first performed on the first coupled histogram, to obtain the histograms of the respective channels; and then match filtering is separately performed on the histograms of the respective channels.

S70. Obtain TdoFs of pulsed lasers of the respective channels according to the histograms of the respective channels. For example, ToF calculation may be performed by the DSP 160 in FIG. 1B and/or other processing units.

S80. Obtain a distance of the target object according to the TOFs of the pulsed lasers. According to an embodiment of this application, output data of two TDCs that are TDC1 and TDC2 share a memory to implement the histogram method. Detailed descriptions are provided below.

As explained above, embodiments of the present invention may use the two following rules below when replicating and sharing TDC outputs:

(1) A quantity of valid bits of a TDC is n. For example, if there are 1023 time bins in a histogram, a number of valid bits of a TDC is 10 (i.e. $2^{10}-1=1023$). In various embodiment, the TDC outputs are binary signals.

(2) Histograms of TDC1 and TDC2 are respectively stored as vectors of intensity values $value_{TDC1}(bin\_index)$ and $value_{TDC2}(bin\_index)$, where bin_index is between 0, and $2^n-1$.

Figure 5A:
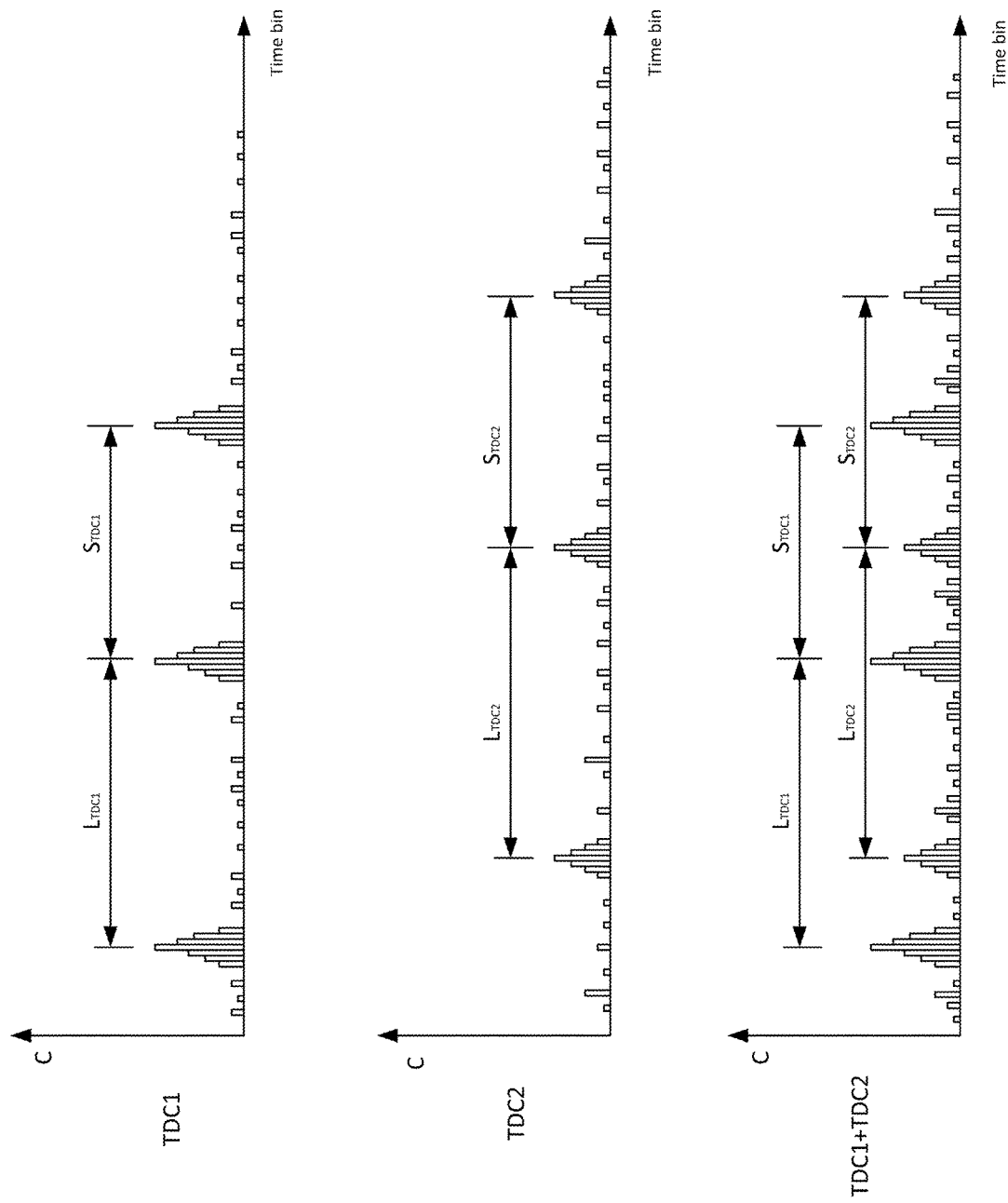
FIG. 5A is a simplified diagram illustrating TDC outputs from two different SPAD pixels sharing a memory block configured as a histogram space without overlaps.

FIG. 5A is a simplified diagram illustrating TDC outputs from two different SPAD pixels sharing a memory block configured as a histogram space without overlaps. This diagram is merely an example, which should not unduly limit the scope of the claims. One of ordinary skill in the art would recognize many variations, alternatives, and modifications. As shown, offset value replicate coding is performed separately (e.g., by different encoders as shown in FIG. 1E) on the vectors of value$_{TDC1}$(bin_index) and value$_{TDC2}$(bin_index), where a replicate code is 2. According to a dTOF manner provided in another embodiment of this application, taking the case of offset value replicate coding shown in FIG. 5A as an example, the specific implementations are as follows:

The vectors value$_{TDC1}$(bin_index) and value$_{TDC2}$(bin_index) are separately shifted twice, and offset values of the respective vectors are predefined. For example, offsent values LTDC1, STDC1, LTDC2, and STDC2 and illustrated in FIG. 5A are all predefined. Having predefined offset values per TDC output data affords an efficient decoding process, as TDC outputs and replicates thereof can be identified quickly. For exmasple, value$_{TDC1}$(bin_index), value$_{TDC1}$(bin_index+L$_{TDC1}$), value$_{TDC1}$(bin_index+L$_{TDC1}$+S$_{TDC1}$), value$_{TDC2}$(bin_index), value$_{TDC2}$(bin_index+L$_{TDC2}$), and value$_{TDC2}$(bin_index+L$_{TDC2}$+S$_{TDC2}$) calculated and and shown in FIG. 5A. It is to be noted that while offset values are predefined per TDC outputs, offset values are distinct and different from one another to reduce the chance of overlapping of useful pulse waveforms.

As explained above, sharing memory blocks between SPAD pixels involving writing (or adding) intensity values of TDC output and replicates to their corresponding time bin locations. For example, the resulting histogram as shown (i.e., TDC1+TDC2) may be calculated using the equation below:

Value_sum=value$_{TDC1}$(bin_index)+value$_{TDC1}$(bin_index+L$_{TDC1}$)+value$_{TDC1}$(bin_index+L$_{TDC1}$+S$_{TDC1}$)+value$_{TDC2}$(bin_index)+value$_{TDC2}$(bin_index+L$_{TDC2}$)+value$_{TDC2}$(bin_index+L$_{TDC2}$+S$_{TDC2}$).

To avoid data loss caused by value shift, the variable length(Value sum) is used to represent a depth of memory:

Length(Value_sum)=$2^n$+max{L$_{TDC1}$+S$_{TDC1}$, L$_{TDC2}$+S$_{TDC2}$}.

For example, the variable max{L$_{TDC1}$+S$_{TDC1}$, L$_{TDC2}$+S$_{TDC2}$} corresponds to the extended memory section with x number of memory units shown in FIG. 1D. It is understood the offset values (e.g., L$_{TDC1}$, S$_{TDC1}$, L$_{TDC2}$, and S$_{TDC2}$) are optimized to avoid overlapping useful data. For example, offset values may be defined based on the number of TDC sharing a single memory block, the width of the transmitted laser pulse signal, the number of time bins, and/or other factors. Poor offset value selection could lead to histograms of the overlapping of valid data regions, thereby making it difficult and inaccurate to decouple the histograms of the two TDCs. In various embodiment, to avoid the case that decoupling cannot be performed, values of L$_{TDC1}$, S$_{TDC1}$, L$_{TDC2}$, and S$_{TDC2}$ may be defined with the consideration of factors such as a laser pulse width, receiving lens distortion, and temperature drift.

As an example, decoupling of a histogram is performed. Known information such as a code, a pulse width, and transmission power of a transmitted signal may be used for performing match filtering on Value_sum to obtain value_sum_filter. Respective peaks of value_sum_filter and half-weight widths of the respective peaks are found. If a half-weight width is greater than a transmission pulse width, it may be determined that valid histograms of a plurality of channels overlap, and this half-weight width may be excluded. Therefore, as long as there are more than two independent peaks for respective channels on value_sum_filter, histograms of the respective channels may be decoupled.

In a specific embodiment, the number of replicates is two (e.g., as shown in FIG. 5A); respective vectors are shifted by different offset values two (e.g., the histogram for TDC1 includes a first replicate shifted by an offset of L$_{TDC1}$ and second replicate shifted by an offset of L$_{TDC2}$). Depending on the implementation, the TDC output vectors may be replicated and shifted in other ways and amounts as well.

In certain embodiments, output data of three TDCs that are TDC1, TDC2, and TDC3 share a memory to implement the histogram method. Detailed descriptions are provided below. As an example of three TDCs sharing a single memory block, the following two rules are used:

(1) The number of valid bits of a TDC is n. If there are 1023 time bins in a histogram, the number of valid bits of a TDC is 10, i.e. $2^{10}-1=1023$, where an output of the TDC is a binary digital signal.

(2) Histograms of TDC1, TDC2, and TDC3 are respectively represented using vectors of value$_{TDC1}$(bin_index), value$_{TDC2}$(bin_index), and value$_{TDC3}$(bin_index), where bin_index $\in[0,2^N-1)$. The offset value replicate coding is separately performed on the vectors of value$_{TDC1}$(bin_index), value$_{TDC2}$(bin_index), and value$_{TDC3}$(bin_index), where a replicate code is 2. That is, the vectors value$_{TDC1}$(bin_index), value$_{TDC2}$(bin_index), and value$_{TDC3}$(bin_index) are shift twice using their respective offset values. The offset values are predefined. For example, value$_{TDC1}$(bin_index), value$_{TDC1}$(bin_index+L$_{TDC1}$), value$_{TDC1}$(bin_index+L$_{TDC1}$+S$_{TDC1}$), value$_{TDC2}$(bin_index), value$_{TDC2}$(bin_index+L$_{TDC2}$), value$_{TDC2}$(bin_index+L$_{TDC2}$+S$_{TDC2}$), value$_{TDC3}$(bin_index), value$_{TDC3}$(bin_index+L$_{TDC3}$), and value$_{TDC3}$(bin_index+L$_{TDC3}$+S$_{TDC3}$) are obtained.

As explained above, sharing memory blocks between SPAD pixels involving writing (or adding) intensity values of TDC output and replicates to their corresponding time bin locations. For example, the resulting histogram as shown (i.e., TDC1+TDC2) may be calculated using the equation below:

Value_sum=value$_{TDC1}$(bin_index)+value$_{TDC1}$(bin_index+L$_{TDC1}$)+value$_{TDC1}$(bin_index+L$_{TDC1}$+S$_{TDC1}$)+value$_{TDC2}$(bin_index)+value$_{TDC2}$(bin_index+L$_{TDC2}$)+value$_{TDC2}$(bin_index+L$_{TDC2}$+S$_{TDC2}$)+value$_{TDC3}$(bin_index)+value$_{TDC3}$(bin_index+L$_{TDC3}$)+value$_{TDC3}$(bin_index+L$_{TDC3}$+S$_{TDC3}$).

To avoid data loss caused by translation, Length(Value sum) is used to represent a depth of memory:

Length(Value_sum)=$2^N$+max{L$_{TDC1}$+S$_{TDC1}$, L$_{TDC2}$+S$_{TDC2}$, L$_{TDC3}$+S$_{TDC3}$}.

For example, the variable max{L$_{TDC1}$+S$_{TDC1}$, L$_{TDC2}$+S$_{TDC2}$, L$_{TDC3}$+S$_{TDC3}$} corresponds to the the extended memory section with x number of memory units shown in FIG. 1D. Similarly, if parameters such as L$_{TDC1}$, S$_{TDC1}$, L$_{TDC2}$, S$_{TDC2}$, L$_{TDC3}$, and S$_{TDC3}$ are not properly selected, valid peaks of histograms of the three TDCs overlap, thereby making it difficult to decode the histograms of the three TDCs. Therefore, to avoid the case that decoupling cannot be performed, values of L$_{TDC1}$, S$_{TDC1}$, L$_{TDC2}$, S$_{TDC2}$, L$_{TDC3}$, and S$_{TDC3}$ need to be set according to various factors such as a laser pulse width, receiving lens distortion, or others.

As an example, decoupling of a histogram is performed. Known information such as a code, a pulse width, and transmission power of a transmitted signal may be used for performing match filtering on Value_sum to obtain value_sum_filter. Respective peaks of value_sum_filter and half-weight widths of the respective peaks are found. If a half-weight width is greater than a threshold width (e.g., defined based on width "W" in FIG. 4), it may be determined that valid histograms of a plurality of channels overlap, and this half-weight width may be excluded. Therefore, as long as there are more than two independent peaks for respective channels on value_sum_filter, histograms of the respective channels may be decoupled.

According to an embodiment, output data of two TDCs that are TDC1 and TDC2 share a memory to implement the histogram method. For example, the following two rules may be used:

(1) The number of valid bits of a TDC is n. If there are 1023 time bins in a histogram, the number of valid bits of a TDC is 10, i.e. $2^{10}-1=1023$. For example, the output of the TDC is a binary digital signal).

(2) Histograms of TDC1 and TDC2 are respectively represented using vectors of $value_{TDC1}(bin\_index)$ and $value_{TDC2}(bin\_index)$, where $bin\_index \in [0, 2^N-1)$.

The vectors of $value_{TDC1}(bin\_index)$ and $value_{TDC2}(bin\_index)$ are separately shifted three times, and offset values of the respective vectors are predefined. That is, the vectors $value_{TDC1}(bin\_index)$ and $value_{TDC2}(bin\_index)$ are separately translated three times, and respective translation step lengths of the respective vectors are fixed. In this way, $value_{TDC1}(bin\_index)$, $value_{TDC1}(bin\_index+L_{TDC1})$, $value_{TDC1}(bin\_index+L_{TDC1}+S_{TDC1})$, $value_{TDC1}(bin\_index+L_{TDC1}+S_{TDC1}+M_{TDC1})$, $value_{TDC2}(bin\_index)$, $value_{TDC2}(bin\_index+L_{TDC2})$, $value_{TDC2}(bin\_index+L_{TDC2}+S_{TDC2})$, and $value_{TDC2}(bin\_index+L_{TDC2}+S_{TDC2}+M_{TDC2})$ are obtained.

As explained above, sharing memory blocks between SPAD pixels involves writing (or adding) intensity values of TDC output and replicates to their corresponding time bin locations. For example, the resulting histogram as shown (i.e., TDC1+TDC2) may be calculated using the equation below:

$$Value\_sum = value_{TDC1}(bin\_index) + value_{TDC1}(bin\_index+L_{TDC1}) + value_{TDC1}(bin\_index+L_{TDC1}+S_{TDC1}) + value_{TDC1}(bin\_index+L_{TDC1}+S_{TDC1}+M_{TDC1}) + value_{TDC2}(bin\_index) + value_{TDC2}(bin\_index+L_{TDC2}) + value_{TDC2}(bin\_index+L_{TDC2}+S_{TDC2}) + value_{TDC2}(bin\_index+L_{TDC2}+S_{TDC2}+M_{TDC2}).$$

To avoid data loss caused by value shift, the variable length(Value sum) is used to represent a depth of memory:

$$Length(Value\_sum) = 2^n + \max\{L_{TDC1}+S_{TDC1}, L_{TDC2}+S_{TDC2}\}.$$

For example, the variable $\max\{L_{TDC1}+S_{TDC1}, L_{TDC2}+S_{TDC2}\}$ corresponds to the extended memory section with x number of memory units shown in FIG. 1D. It is understood the offset values (e.g., $L_{TDC1}$, $S_{TDC1}$, $L_{TDC2}$, and $S_{TDC2}$) are optimized to avoid overlapping useful data. For example, offset values may be defined based on the number of TDC sharing a single memory block, the width of the transmitted laser pulse signal, the number of time bins, and/or other factors. Poor offset value selection could lead to histograms of the overlapping of valid data regions, thereby making it difficult and inaccurate to decouple the histograms of the two TDCs. In various embodiment, to avoid the case that decoupling cannot be performed, values of $L_{TDC1}$, $S_{TDC1}$, $L_{TDC2}$, and $S_{TDC2}$ may be defined with the consideration of factors such as a laser pulse width, receiving lens distortion, and temperature drift.

As an example, decoupling of a histogram is performed. Known information such as a code, a pulse width, and transmission power of a transmitted signal may be used for performing match filtering on Value_sum to obtain value_sum_filter. Respective peaks of value_sum_filter and half-weight widths of the respective peaks are found. If a half-weight width is greater than a transmission pulse width, it may be determined that valid histograms of a plurality of channels overlap, and this half-weight width may be excluded. Therefore, as long as there are more than two independent peaks for respective channels on value_sum_filter, histograms of the respective channels may be decoupled.

Figure 5B:
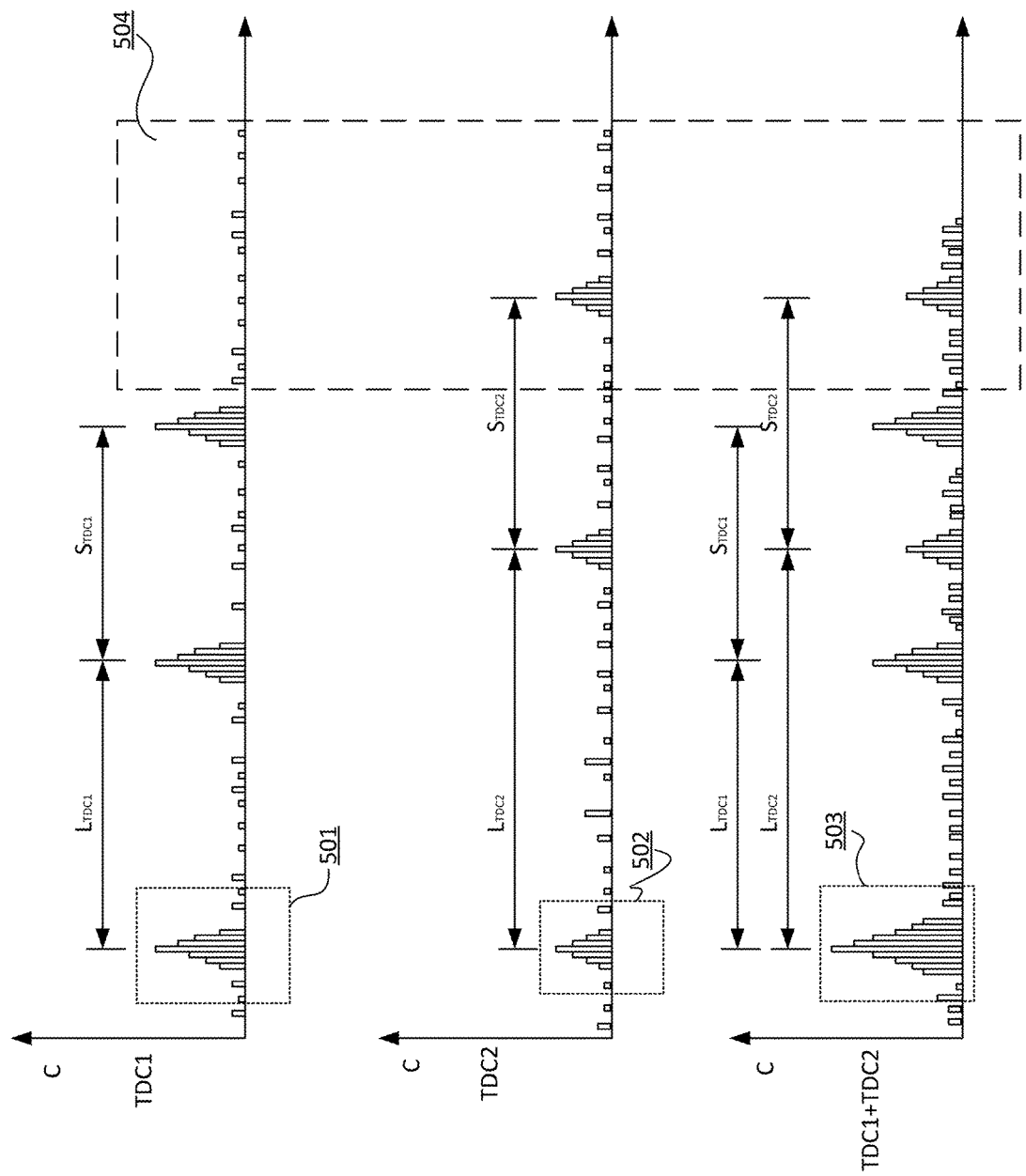
FIG. 5B is a simplified diagram illustrating TDC outputs from two different SPAD pixels sharing a memory block configured as a histogram space with an overlap.

FIG. 5B is a simplified diagram illustrating TDC outputs from two different SPAD pixels sharing a memory block configured as a histogram space with an overlap. This diagram is merely an example, which should not unduly limit the scope of the claims. One of ordinary skill in the art would recognize many variations, alternatives, and modifications. The valid data region of TDC1 is at region 501 as shown, and its two replicates are respectively shifted by offsets $L_{TDC1}$ and $S_{TDC1}$. The valid data region of TDC2 is at region 502 as shown, and its two replicates are respectively shifted by offsets $L_{TDC2}$ and $S_{TDC2}$. Because offset values are different, the valid data regions of the replicates do not overlap. However, region 501 and region 502 overlap at region 503. In region 503, the waveform as shown is the sum of two valid data regions, and this waveform is invalid. During the decoding process, region 503 can be identified as invalid in various ways. It is to be noted that being the sum of two valid data regions, the waveform at region 503 has a much higher intensity compared to other waveforms. Since it is rare—near impossible when offset values are optimally defined—to have multiple instances of valid data region overlapping, a region like 503 that contains a waveform that is higher than that of other valid data regions can be identified as containing invalid data. In various embodiments, the width pulse waveform at valid data regions is used to identify the overlapped data. For example, even though pulse waveforms at 501 and 502 may share the same width, the invalid waveform at 503 is characterized by a greater width due to partial overlapping, as exact overlapping (i.e., overlapping at the same time bin locations) is very rare or impossible in most implementations. If the width of a valid waveform is w, the width an invalid waveform is between w and 2w.

It is to be appreciated that there are other ways to identify overlapping of valid data regions as well. For example, since the number of replicates is known, six valid regions with their respective peak intensities should be identified when there is no overlapping, but here in FIG. 5B, only five regions contain peak intensities, which means there is an overlap region.

It is to be noted when valid data regions of TDCs replicated and shifted, noise data are replicated and shifted as well. Since noise data are replicated, the signal-to-noise ratio (SNR) of the shared histogram data may be reduced compared to the TDC output prior to memory sharing. For example, the SNR ratio of at least 36 is set for the TDC to ensure that the SNR of the histogram, both before and after memory sharing, does not drop below a threshold level.

Also shown in FIG. 5B is the extended region 504, which corresponds to the x memory units, or $\max\{L_{TDC1}+S_{TDC1}, L_{TDC2}+S_{TDC2}\}$ describe above, that is configured to store replicate data that are shifted by the offset such as $L_{TDC1}$ and $S_{TDC1}$. In certain embodiments, the shift of offset values may be "carried" over; that is, the offset $S_{TDC1}$ may shift the second replicate as shown to a location to the left of region 501. There may be other implementations as well.

In addition, for each SPAD array, each pixel in the array may be connected to a TDC, or every several SPADs share a TDC in a binning manner. In this case, output signals of a plurality of TDCs may still use the ranging method based on shared memory according to the foregoing embodiments.

The embodiments of this application further provide a 3D imaging system, including a laser transmitter, a transmission optical system, a receiving optical system, a dTOF sensor, a TDC, and a memory, where the system uses the ranging method based on shared memory implemented in the foregoing embodiments.

In addition, the 3D imaging system may determine the depths and bit widths of memory that respective dTOF sensors need according to a ranging range and an allowable SNR parameter.

A system of one or more computers or processor can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for range determination using shared memory. The method includes transmitting, by a transmitting end, a pulsed laser. The method also includes receiving an optical signal reflected by a target object and converting the received optical signal into an analog electrical signal by a receiving end, where the receiving end may include a plurality of pixel units. The method also includes converting analog electrical signals outputted by the pixel units into digital signals and outputting same by using time-to-digital converters (TDCs) in respective channels. The method also includes performing offset value replicate coding on the digital signals outputted by the TDCs in the respective channels, to obtain offset value replicate coding sequences. The method also includes coupling offset value replicate coding sequences of at least two channels to obtain a first coupled histogram and storing same, where the first coupled histogram is associated with a time of flight (ToF) of the pulsed laser and intensities of the digital signals. The method also includes decoupling the offset value replicate coding sequences in the first coupled histogram, to obtain histograms of the respective channels. The method also includes obtaining ToFs of pulsed lasers of the respective channels according to the histograms of the respective channels. The method also includes obtaining a distance of the target object according to the ToFs of the pulsed lasers. Other embodiments of this aspect include corresponding computer systems, apparatus, and computer programs recorded on one or more computer storage devices, each configured to perform the actions of the methods.

Implementations may include one or more of the following features. The method where the performing offset value replicate coding on the digital signals outputted by the TDCs in the respective channels, to obtain offset value replicate coding sequences may include: representing the histograms using vectors of histogram values; and shifting the vectors for a plurality of times to obtain coded vectors. The coupling offset value replicate coding sequences of at least two channels to obtain a first coupled histogram and storing same may include: adding the coded vectors obtained in the at least two channels, to obtain the first coupled histogram vectors and store the same. The pixel units may include a single-photon avalanche diode (SPAD). Respective translation step lengths of the respective vectors are fixed. The decoupling the offset value replicate coding sequences in the first coupled histogram, to obtain histograms of the respective channels may include: performing match filtering on the first coupled histogram, to obtain a second coupled histogram; and decoupling the second coupled histogram, to obtain the histograms of the respective channels. The performing match filtering on the first coupled histogram, to obtain a second coupled histogram may include: determining a match filtering parameter according to a code, a pulse width, or transmission power of the transmitted pulsed laser. The decoupling the second coupled histogram, to obtain the histograms of the respective channels may include: comparing half-height widths of respective peaks in the second coupled histogram with the transmission pulse width of the transmitted pulsed laser, and when the half-height widths are less than or equal to the transmission pulse width and there are more than two offset value replicate coding sequences of the second coupled histogram in the respective channels, decoupling the second coupled histogram, to obtain the histograms of the respective channels. Implementations of the described techniques may include hardware, a method or process, or computer software on a computer-accessible medium.

According to some embodiments, the present invention provides a lidar system that includes a laser source configured to generate a laser signal at a first time within a time interval. The system also includes an optical module configured receiving a reflected laser signal at a second time. The system also includes a SPAD sensor may include a plurality of SPAD pixels, the plurality of SPAD pixels may include a first SPAD pixel and a second SPAD pixel, the first SPAD pixel being configured to generate a first electrical output based on the reflected laser signal, the second SPAD pixel being configured to generate a second electrical output based on the reflected laser signal. The system also includes a time-to-digital converter (TDC) module configured to generate a first histogram data based on the first output signal and a second histogram based on the second electrical output, the first histogram data including a first intensity data and a first time bin data, the second histogram data including a second first intensity data and a second time bin data. The system also includes an encoder configured to generate a first replicated histogram data based on the first histogram data and a second replicated histogram data based on the second histogram data, the first replicated histogram data including the first intensity data and a first shifted time bin data, the second replicated histogram data including the second intensity data and a second shifted time bin data. The system also includes a memory including a plurality of memory blocks allocated to the plurality of SPAD pixels, the plurality of memory blocks including a first memory block, the first memory block being configured to store the first histogram data, the second histogram data, the first replicated histogram data, and the second replicated histogram data. The system also includes a decoder configured to reconstruct a first decode data based on the first histogram data or the first replicated histogram data.

Implementations may include one or more of the following features. The TDC module may include a first TDC coupled to the first pixel and a second TDC coupled to the second pixel. The first memory block may include a time bin section and an extended section, the extend section being allocated to store the first replicated histogram data. The a size of the time bin section is defined based on the time interval. The decoder is configured to identify invalid histogram data stored in the memory. The decoder selects a valid data region based on a width of the laser signal. The decoder selects a valid data region based on an SNR threshold. The lidar system may include may include a processor configured to determine a flight time based on the first decoded data and the first time. The processor is further may include to calculate a distance value based on the flight time. The lidar system may include a control module, the control module being configured to activate the SPAD sensor and the TDC module at the first time. Implementations of the described techniques may include hardware, a method or process, or computer software on a computer-accessible medium.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for range determination using shared memory, the method comprising:
   transmitting, by a transmitting end, a pulsed laser;
   receiving an optical signal reflected by a target object and converting the received optical signal into an analog electrical signal by a receiving end, wherein the receiving end comprises a plurality of pixel units;
   converting analog electrical signals outputted by the pixel units into digital signals and outputting the digital signals by using time-to-digital converters (TDCs) in respective channels;
   performing offset value replicate coding on the digital signals outputted by the TDCs in the respective channels, to obtain offset value replicate coding sequences;
   coupling offset value replicate coding sequences of at least two channels to obtain a first coupled histogram and storing the first coupled histogram, wherein the first coupled histogram is associated with a time of flight (TOF) of the pulsed laser and intensities of the digital signals;
   decoupling the offset value replicate coding sequences in the first coupled histogram, to obtain histograms of the respective channels;
   obtaining TOFs of pulsed lasers of the respective channels according to the histograms of the respective channels; and
   obtaining a distance of the target object according to the TOFs of the pulsed lasers.

2. The method of claim 1, wherein the performing offset value replicate coding on the digital signals outputted by the TDCs in the respective channels, to obtain offset value replicate coding sequences comprises:
   representing the histograms of the respective channels using vectors of histogram values; and
   shifting the vectors for a plurality of times to obtain coded vectors.

3. The method of claim 2, wherein the coupling offset value replicate coding sequences of the at least two channels to obtain the first coupled histogram and storing the first coupled histogram comprises:
   adding the coded vectors obtained in the at least two channels, to obtain first coupled histogram vectors and store the first coupled histogram vectors.

4. The method of claim 1, wherein the decoupling the offset value replicate coding sequences in the first coupled histogram, to obtain the histograms of the respective channels comprises:
   performing match filtering on the first coupled histogram, to obtain a second coupled histogram; and
   decoupling the second coupled histogram, to obtain the histograms of the respective channels.

5. The method according to claim 4, wherein the performing match filtering on the first coupled histogram, to obtain the second coupled histogram comprises:
   defining a match filtering parameter according to a code, a pulse width, or transmission power of the pulsed laser.

6. The method according to claim 5, wherein the decoupling the second coupled histogram, to obtain the histograms of the respective channels comprises:
   comparing half-height widths of respective peaks in the second coupled histogram with a transmission pulse width of the transmitted pulsed laser, and when the half-height widths are less than the transmission pulse width and there are more than two offset value replicate coding sequences of the second coupled histogram, decoupling the second coupled histogram, to obtain the histograms of the respective channels.

7. The method according to claim 2, wherein respective translation step lengths of the respective vectors are predefined.

8. The method according to any one of claim 1, wherein the pixel units each comprise a single-photon avalanche diode (SPAD).

9. A lidar system comprising:
   a laser source configured to generate a laser signal at a first time within a time interval;
   an optical module configured to receive a reflected laser signal at a second time;
   a single-photon avalanche diode (SPAD) sensor comprising a plurality of SPAD pixels, the plurality of SPAD pixels comprising a first SPAD pixel and a second SPAD pixel, the first SPAD pixel being configured to generate a first electrical output based on the reflected laser signal, the second SPAD pixel being configured to generate a second electrical output based on the reflected laser signal;
   a time-to-digital converter (TDC) module configured to generate first histogram data based on the first electrical output and second histogram data based on the second electrical output, the first histogram data including first intensity data and first time bin data, the second histogram data including second intensity data and second time bin data;
   an encoder configured to generate first replicated histogram data based on the first histogram data and second replicate histogram data based on the second histogram data, the first replicate histogram data including the first intensity data and first shifted time bin data, the second replicate histogram data including the second intensity data and second shifted time bin data;
   a memory including a plurality of memory blocks allocated to the plurality of SPAD pixels, the plurality of memory blocks including a first memory block, the first memory block being configured to store the first histogram data, the second histogram data, the first replicate histogram data, and the second replicate histogram data; and a decoder configured to reconstruct first decoded data based on the first histogram data or the first replicated histogram data.

10. The lidar system of claim 9 wherein the TDC module comprises a first TDC coupled to the first pixel and a second TDC coupled to the second pixel.

11. The lidar system of claim 9 wherein the first memory block comprises a time bin section and an extended section, the extended section being allocated to store the first replicated histogram data, and the first histogram data and the second histogram data being stored at the time bin section.

12. The lidar system of claim 1 wherein a size of the time bin section is allocated based on the time interval.

13. The lidar system of claim 9 wherein the decoder is configured to identify invalid histogram data stored in the memory.

14. The lidar system of claim 13 wherein the decoder selects a valid data region based on a width of the laser signal.

15. The lidar system of claim 13 wherein the decoder selects a valid data region based on an SNR threshold.

16. The lidar system of claim 9 further comprising a processor configured to determine a flight time based on the first decoded data and the first time.

17. The lidar system of claim 16 wherein the processor is further configured to calculate a distance value based on the flight time.

18. The lidar system of claim 9 further comprising a control module, the control module being configured to activate the SPAD sensor and the TDC module after the first time.

\* \* \* \* \*